United States Patent

[11] 3,547,376

[72] Inventors T. O. Paine
Administrator of the National Aeronautics and Space Administration in respect to an Invention of;
Earl M. Van Alstyne, Laguna Hills, Calif.
[21] Appl. No. 850,586
[22] Filed Aug. 15, 1969
[45] Patented Dec. 15, 1970

[54] SPACECRAFT
7 Claims, 13 Drawing Figs.
[52] U.S. Cl. ................................................ 244/1,
244/113, 244/138
[51] Int. Cl. .................................................. B64g 1/00
[50] Field of Search ........................................ 244/1SS,
138, 113

[56] References Cited
UNITED STATES PATENTS
3,231,219  1/1966  Young ........................... 244/1(SS)
3,289,974  12/1966  Cohen et al .................... 244/1(SS)

*Primary Examiner*—Milton Buchler
*Assistant Examiner*—Jeffrey L. Forman
*Attorneys*—Russell E. Schlorff, Marvin F. Matthews and G. T. McCoy ABSTRACT: A spacecraft arranged such that it has an aerodynamic outer shell which acts as the heat shield. It includes an excursion module removably housed within the shell, with the module having a retracted landing gear and a forwardly thrusting thrust means, such as an engine, at the forward end thereof and a crew station generally rearward of the landing gear. It also includes means for separating the module from the shell after separation, whereby the spacecraft can then be landed by activation of the thrust means to land the vehicle forward end down.

PATENTED DEC 15 1970 3,547,376

Earl M. Van Alstyne
INVENTOR.

BY
ATTORNEY

Earl M. Van Alstyne
INVENTOR.

BY
ATTORNEY

SPACECRAFT

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates to a spacecraft having a jettisonable heat shield. More particularly, it relates to a spacecraft having such a heat shield together with extendable landing gear mounted inside of the forward end of the shell.

For a spacecraft of the type which would be useful for exploration of Mars, for example, it is desirable to have an excursion module which has a jettisonable heat shield, which thereby provides a vehicle with a lower terminal landing and ascent weight, a lower center of gravity, and improved visibility of crew. It is also desirable to have a spacecraft which does not require turnaround during descent, since this keeps the crew and all systems in a single attitude to the flight and landing path during this very critical period. Furthermore, the altitude- and velocity-sensing apparatus would not be interrupted, the crew position with respect to retardation, landing, and lift-off would not be altered and therefore proximity to instruments and control would remain the same. Furthermore, the crew scanning provisions would remain in a most simple form because the landing objective would always be in the same direction.

2. Description of the Prior Art

Heretofore, spacecraft have not been designed with jettisonable heat shields, and with extendable landing gear inside of the forward end of the shield, and with crew stations rearward of the landing gear.

SUMMARY OF THE INVENTION

This invention includes a spacecraft having a jettisonable aerodynamic shell of heat-resistant material to provide a heat shield. It includes an excursion module removably housed in the shell. The module has a retracted landing gear and a forwardly thrusting thrust means, such as a rocket engine, at the forward end thereof. The module also includes a crew station generally rearward of the landing gear. Means are also provided for jettisoning or separating the module from the shell before landing of the module, whereby the rocket engine may be operated after removal of the shell to provide braking of the module and hover capabilities, if required during the landing.

Means may also be provided for slowing the velocity of the module and shell before separation of the module from the shell, during which time the heat shield capabilities of the shell would be utilized to protect the module. The means for separating the module from the shell may include thrusters or means for splitting the shell so that it falls away.

BRIEF DESCRIPTION OF THE DRAWINGS

Reference to the drawings will further explain the invention wherein.

DESCRIPTION OF THE PREFERRED EMBODIMENT

Figure 1A:
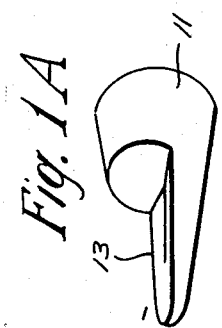
FIG. 1A shows a mother space vehicle.
Figure 1B:
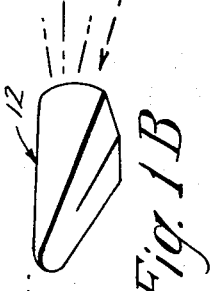
FIG. 1B shows a spacecraft of this invention shortly after separation from the mother vehicle.
Figure 1C:
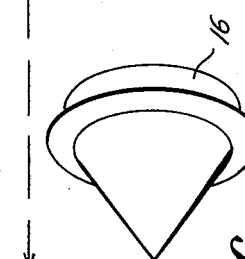
FIG. 1C shows a spacecraft of this invention being decelerated.
Figure 1D:
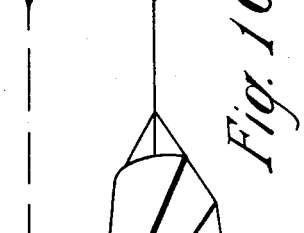
FIG. 1D shows the separation of the module from the shell.

Referring now to the various FIGS. 1, and FIG. 1A first, a mother space vehicle 11 is shown as it might appear in orbit around the planet Mars traveling with the blunt end rearward and pointed end forward and moving from right to left as shown in FIG. 1. The spacecraft of this invention is generally designated by the numeral 12 and is of aerodynamic configuration and conforms with the recess 13, shown in the forward end of space vehicle 11, from which it is shown separate. This separation is accomplished by release of conventional latch means plus operation of thrusters 14, shown in FIGS. 2 and 3.

The spacecraft 12 is then decelerated in the Mars atmosphere by "air braking," or by deployment of atmosphere-resisting element such as a parachute or ballute 16, or both. Outer shell 18 is of heat-resistant material so that it serves as a heat shield during entry into the atmosphere. Thereafter it is jettisonable to reduce landing weight.

Figure 1E:
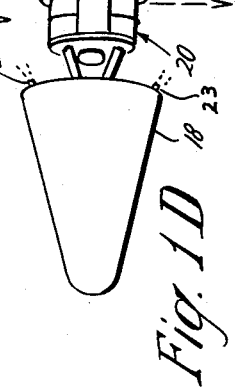
FIG. 1E shows the landing gear of the module extended and the thrust means actuated to slow descent of the module.
Figure 1F:
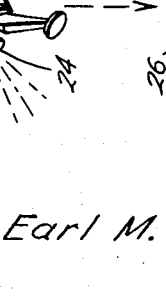
FIG. 1F shows the spacecraft landed.
Figure 3:
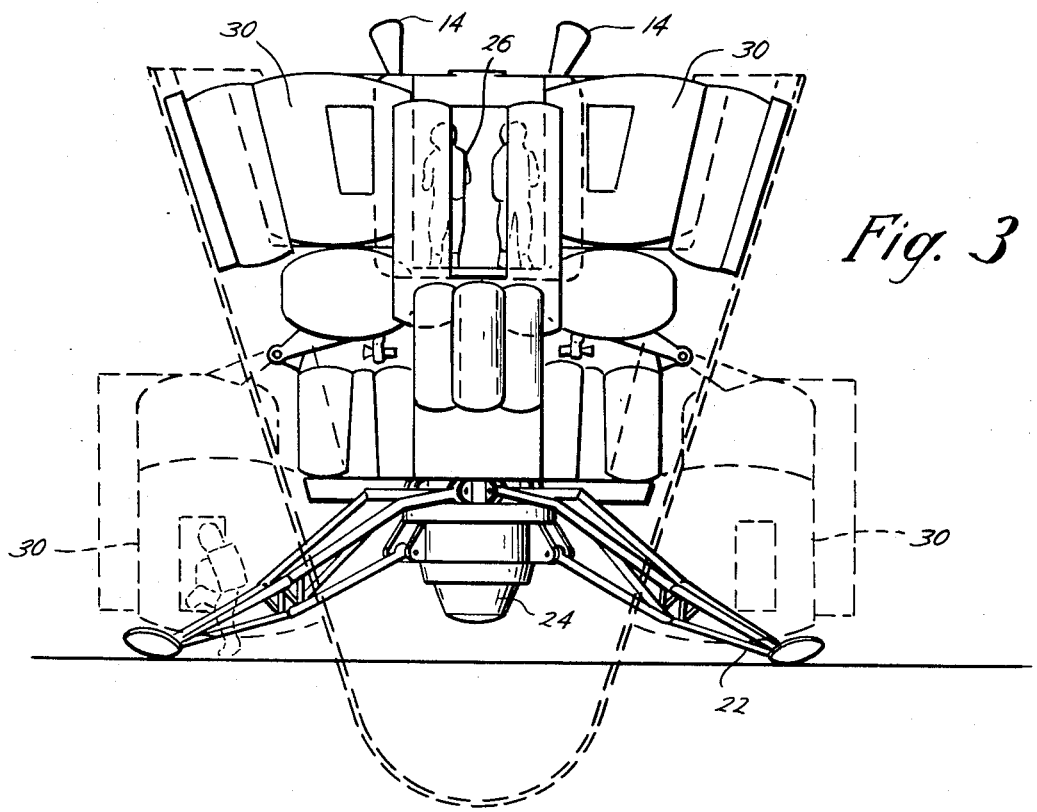
FIG. 3 is a view of the spacecraft shown in FIG. 2, but rotated 180° therefrom, and showing the shell jettisoned, the landing gear deployed, and the module landed.
Figure 2:
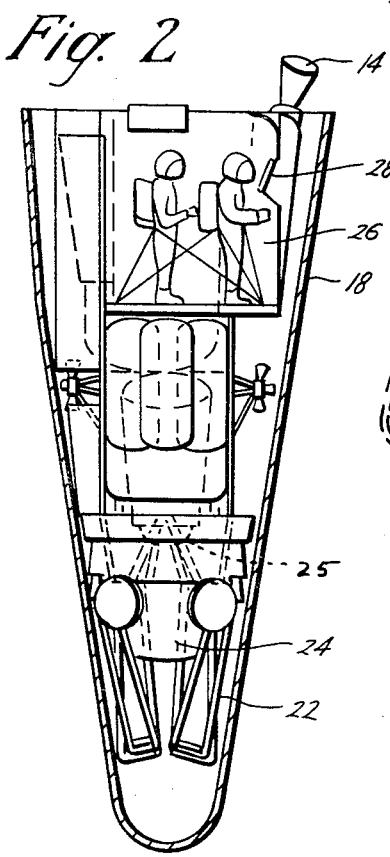
FIG. 2 is a side elevation view, partly in central section, showing the module housed within the shell.
Figure 4:
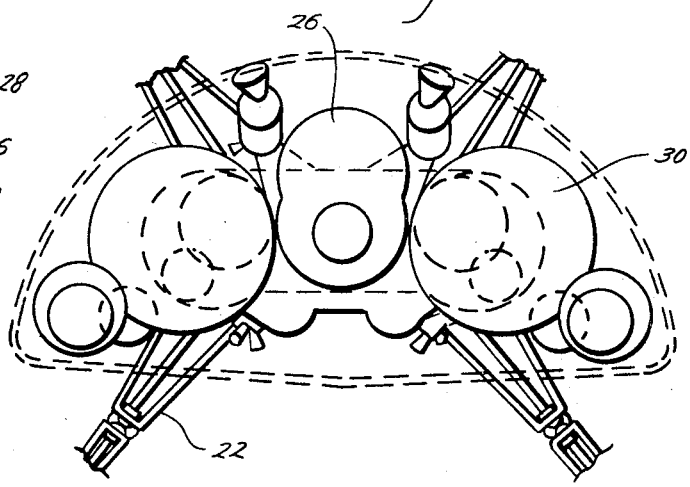
FIG. 4 is a top plan view of the spacecraft shown in FIG. 3.

The outer shell 18 may be jettisoned by operation of thrusters 23 attached to shell 18. Alternatively, shell 18 could be built in sections and, by use of explosives or other means, arranged for separation from the spacecraft. The landing gear 22, which is shown in the stowed or retracted position in FIG. 2, is then actuated to the landing position as shown in FIGS. 1E and 3. With the landing gear deployed, the forwardly thrusting thrust means in the form of descent engine 24 is ignited and provides retroforce for landing and hovering capabilities.

It will be noted that the descent engine 24 and landing gear 22 are toward the forward end of the spacecraft in the initial assembled condition. The spacecraft also includes a crew station designed by the numeral 26 generally rearward of the landing gear 22 and descent engine 24, and arranged such that the crew is positioned in a generally vertical position relative to the landing plane of the Mars surface.

Since the retardation forces are relatively low in landing on the planet Mars, the crew station is arranged for the crew to stand feet downward with primary forces being resisted "eyeballs down." Each man of the crew faces outwardly toward his own scanning window 28 for 360° visual inspection of the landing site. Restraining straps and back supports are secured to the structure to aid crew members in holding their stance against perturbations.

Figure 1G:
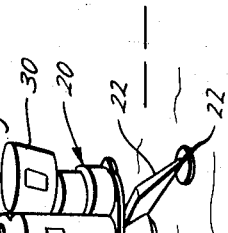
FIG. 1G shows the spacecraft landed with crew compartments deployed.
Figure 1H:
FIG. 1H shows the base portion of the module which remains after lift-off on the return flight.

In addition to crew station 26, living quarters may also be provided for the crew in the form of cabins 30 which are adjacent to crew station 26 and are arranged to fold down in a pivotal manner, as shown in dotted line in FIG. 3 and as shown in solid line in FIG. 1G.

Figure 1I:
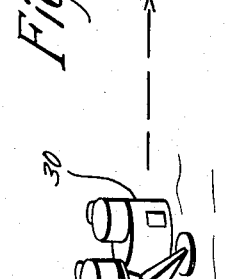
FIG. 1I shows the module lifting off.
Figure 1J:
FIG. 1J shows staging of the module prior to rendezvous.

Return of the crew is accomplished as shown in FIG. 1I by activation of ascent engine 25 to provide lift-off thrust. As ascent continues, staging such as that shown in FIG. 1J with fuel tanks being jettisoned, is required preparatory to rendezvous with mother vehicle 11, for example.

This invention provides a novel Mars excursion module spacecraft arrangement wherein the normal planetary descent mission does not require a turnaround in order to touch down. Outer shell 18 acts as the heat shield and, may be of one or several pieces, and is jettisoned prior to touch down to provide lower gross landing weight and a lower center of gravity for the vehicle.

Descent engine 24 provides the desired retropropulsion during deceleration and for hovering and landing capabilities.

Engine 25 provides lift-off capabilities as discussed above. A preferred type of engine would be of the plug nozzle-type because of its compact design.

It is to be understood that the foregoing description is illustrative only and other embodiments of the invention will be obvious to those skilled in the art in view of this description.

I claim:

1. A spacecraft for landing an excursion module on a celestial body having an atmosphere comprising:
   mother vehicle for conveying the spacecraft into the vicinity of the celestial body;
   an excursion module adapted for attachment to the mother vehicle;
   a jettisonable shell of heat-resistant material surrounding the excursion module;
   means for separating the the excursion module and shell from the mother vehicle;
   retardation means for slowing the velocity of the separated module and shell;
   means for jettisoning said shell after said module has entered the atmosphere and prior to landing on the celestial body;
   said module including a retracted landing gear and a forwardly thrusting means at the forward end thereof; and
   a crew station generally rearward of said landing gear.

2. The invention as claimed in claim 1 including a ballute for retarding the velocity of said module.

3. The invention as claimed in claim 1 wherein said means for separating said spacecraft from said mother vehicle includes at least one propulsion rocket.

4. The invention as claimed in claim 1 wherein said crew station in said module includes at least one cabin arranged for folding downwardly and outwardly upon landing of said module nose down.

5. The invention as claimed in claim 1 wherein said crew station in said module includes means for maintaining the crew in a generally vertical position relative to the landing plane.

6. The invention as claimed in claim 1 wherein said outer shell is generally in the shape of a half cone.

7. The invention as claimed in claim 1 wherein the means for jettisoning said shell includes at least one thruster attached to said shell to accelerate the shell forward of the descending spacecraft.